J. S. KIRFMAN.
TREE PROTECTING DEVICE.
APPLICATION FILED APR. 5, 1917.

1,251,786.

Patented Jan. 1, 1918.

Witness
Will Freeman

Inventor
John S. Kirfman
By Orwig & Bair
Attys.

UNITED STATES PATENT OFFICE.

JOHN S. KIRFMAN, OF DES MOINES, IOWA.

TREE-PROTECTING DEVICE.

1,251,786.  Specification of Letters Patent.  Patented Jan. 1, 1918.

Application filed April 5, 1917. Serial No. 160,019.

*To all whom it may concern:*

Be it known that I, JOHN S. KIRFMAN, a citizen of the United States, and resident of Des Moines, in the county of Polk and State of Iowa, have invented a certain new and useful Tree-Protecting Device, of which the following is a specification.

My invention relates to devices for protecting the lower parts of the trunks of trees, and covering the ground adjacent to the foot of the tree.

The object of my invention is to provide such a device capable of ready and easy adjustment to fit trees or shrubs of different sizes, having an adjustable portion for surrounding the tree trunk.

A further object is to provide such a device having laterally extending means at its lower end adapted to rest flat on the ground which will prevent access to the roots of the trees near the tree trunk, and will prevent grass from growing in a small circle around the tree, and will permit a mower to travel over said laterally extending means for cutting grass around the edge thereof.

My invention consists in the construction, arrangement and combination of the various parts of the device whereby the objects contemplated are attained, as hereinafter more fully set forth, pointed out in my claims, and illustrated in the accompanying drawings, in which:

Figure 1:
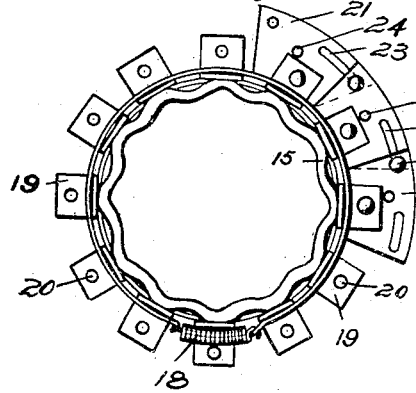
Figure 1 shows a top or plan view of my improved tree protecting device, part of the flat place at the lower end of the device being omitted.

In the accompanying drawings, illustrating one form of my invention, I have used the reference numeral 10 to indicate generally a series of spaced upright members, forming part of the device adapted to extend upright around the trunk of a tree.

The members 10 are adjustably connected together in some suitable way.

Figure 3:
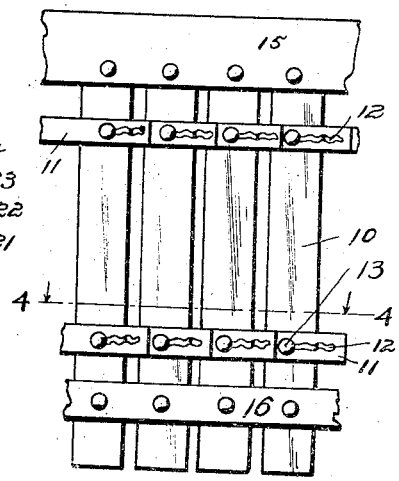
Fig. 3 shows a side elevation of the portion of the device, viewed from the inside thereof.
Figure 2:
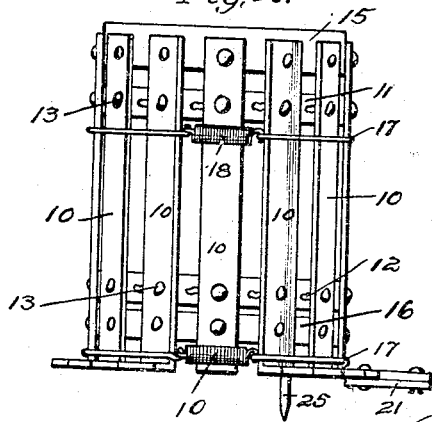
Fig. 2 shows a side elevation of the same, with the parts in their assembled position.
Figure 4:
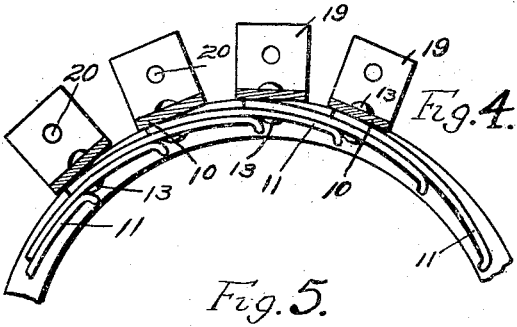
Fig. 4 shows a horizontal, sectional view taken on the line 4—4 of Fig. 3.

In the drawings, I have shown in Figs. 2 and 3 two series of strips 11. Each strip 11 is secured to one of the uprights 10, and is provided with an irregular slot 12 extending longitudinally of the strip. Through the slot 12 is extended a bolt or the like 13. The bolt or the like 13 is designed to fasten one of the strips 11 rigidly to one of the uprights 10, and is designed to extend through the slot 14 of another of said strips 11, which last named strip 11 is rigidly secured to the next adjacent upright 10.

There are two series of the strips 11, one near the top, and one near the lower ends of the uprights. It will be seen that by means of the strips 11, the members 10 are slidably and adjustably connected with each other in a continuous circle. The slots 12 are made irregular, so that when the device is once adjusted to another size it will tend to hold that size, and said frictional engagement must be overcome in order to reduce or enlarge the diameter of the device surrounding the tree trunk.

Secured to the interior side surfaces of the uprights 10, near their upper end is a strip of felt or other absorbent material 15. A similar strip 16 is secured to the inner surfaces of said uprights 10 near the lower ends thereof. The strips 15 and 16 may be treated with drugs or the like for preventing the passage of insects or destructive vermin up and down the tree trunk past said strips. The strips 16 and 15 are so arranged that when the device is in its extended position, as shown in Fig. 3, they are extended, but when the device is collapsed, the strips have some slack, as illustrated in Fig. 1.

If desired, the entire device may be surrounded by wire bands 17 or the like having resilient springs 18 for connecting their ends for yieldingly holding the device against expansion when placed around the tree.

In Fig. 2 I have shown two of said openings 17.

At the lower end of each upright 10 is a laterally outwardly extending flat flange 19 having an opening 20 through it.

Segmental plates 21 may be secured to the flanges 19 in overlapping succession around the device, if desired. When the plates are so used, each plate 12 is bolted to one of the flanges 20 and is slidably connected with the adjacent plates by means of bolts 22. Each bolt 22 is fastened to one plate 21 and is received in a curved slot 23 in an adjacent plate 21. Thus the plates 21 may be slid on each other for permitting the entire device to be expanded or contracted.

The plates 21 are provided with openings 24 which may allow moisture to pass through said plates, and which may also be used for mounting a nail or the like 25 in said plates 21. The nail or the like 25 may be driven into the ground for preventing horizontal movement of the device when it is installed on the tree.

Figure 5:
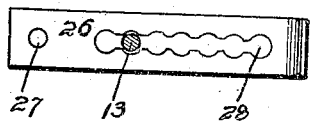
Fig. 5 shows a side elevation of one of the strips on the inside of the device, one of the bolts being shown in the slot therein in section.
Figure 6:
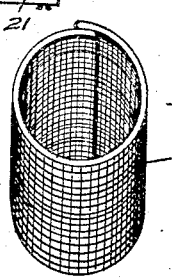
Fig. 6 is a perspective view of the protecting cylinder.

In Fig. 5, I have shown a slightly different form of the strip 11. The strip in Fig. 5, I have indicated by the reference character 26. Such strip has an opening 27 at one end receiving the plate 13 and has an elongated horizontal slot 28 composed of alternate enlarged and contracted portions.

The contracted portions are of such size that the bolts 13 will slide through said contracted portions, and be held tight therein, so that some effort is required to slide the bolt 27 from one enlarged portion to the next enlarged portion of the slot 28. This form of the device is used for holding the entire device in any of its contracted or expanded positions.

Before assembling the device on the tree or the like two of the bolts 13 and one of the bolts 22 may be omitted, until the device is placed on the tree, and the two bolts 13 in question, may be placed in position, and the device extended entirely around the tree will be completed.

The rings 17 may be used if desired. It will be readily seen that the entire diameter of the device may be varied considerably for enlarging or contracting the device for fitting trees of different sizes.

The device is preferably placed on a tree with the strips 15 and 16 fitted snugly against the bottom.

A cylinder 30 of finely meshed screen wire or the like having overlapping edges may be placed inside the device for protection against certain insects. The length of the cylinder 30 is such that it stands between the members 15 and 16.

The use of my device prevents the trees on the lawn from being struck and injured by a lawn mower.

It will be seen that the absorbent strip 15 not only serves to hold medicine or the like, but also serves to cushion any blow by the lawn mower on the protecting device.

It will also be noted that the plates 21 will cover the ground for a short distance around the tree and that a lawn mower can be run over the plates 21 without difficulty, so that by the use of my device, I avoid the necessity of trimming the grass, which grows close around the tree by hand.

On account of the fact that the plates 21 overlap each other, it may be observed that water will run laterally toward the lower edge of said plates, and tend to pass into the ground underneath the plates. Also water will run down the tree trunk, and pass downwardly around the roots under the plates 21.

On account of the adjustability of my device, it may be manufactured in a few standard sizes, which can be adjusted to fit practically any size of tree or shrub.

The device is constructed so that the uprights form units, which may be added in any number desired, so that the device can be changed in size, and at the same time every size is adjustable to allow growth of the tree.

My device will protect trees and shrubs from injury or depredation by animals, especially such as rabbits and the like.

Some changes may be made in the construction, and arrangement of the parts of my improved tree protector without departing from the essential features and principles of my invention, and it is my intention to cover by this application any modified forms of structure or use of mechanical equivalents, which may be reasonably included within the scope of my claims.

I claim as my invention:

1. A tree protecting device, comprising a plurality of upright members arranged in succession around the tree, an annular member comprising a plurality of sections connected with said upright members to permit horizontal sliding movement of said upright members, the device being so constructed as to permit the enlargement or reduction of the device, and the adding or taking out of some upright members and sections.

2. In a tree protector, a plurality of upright members arranged in succession and designed to surround the tree and a plurality of annular members, each made up of a plurality of substantially horizontal strips, each of said strips being fixed to one upright member, and slidably mounted with relation to an adjacent upright member.

3. In a tree protector, a plurality of upright members arranged in succession in a circle, and a plurality of annular members each having a plurality of detachably mounted strips each secured to one of said upright members and slidably mounted on an adjacent strip.

4. A tree protecting device, comprising a plurality of upright members arranged in succession around the tree, an annular member comprising a plurality of sections connected with said upright members to permit horizontal sliding movement of said upright members, the device being so constructed as to permit the enlargement or reduction of the device, and the adding or taking out of some upright members and sections, said device having at its lower edge a flat outwardly extending segmental flange member adapted to rest on the ground and permit a mower or the like to pass over it.

5. In a device of the class described, a plurality of upright members arranged in succession in a circle, means for adjustably, slidably connecting said members together, said means comprising strips secured in succession to said upright members, each strip being made of resilient material and having slots of irregular outline, and bolts secured to said upright members and extended through said slots, the parts being so arranged that the strips must be sprung slightly for moving said bolts from one part of said slots to other parts thereof.

6. In a device of the class described, a series of overlapping segmental plates, arranged in a circle and operatively connected together for permitting their relative sliding movement for increasing or decreasing the diameter of the circle prescribed by said plates, said plates being adapted to rest flat on the ground and around a tree for preventing the growth of grass or weeds immediately around the tree, and for permitting a lawn mower to pass over said plates.

Des Moines, Iowa, February 26, 1917.

JOHN S. KIRFMAN.

Copies of this patent may be obtained for five cents each, by addressing the "Commissioner of Patents, Washington, D. C."